United States Patent [19]

Ruter

[11] Patent Number: 5,205,634
[45] Date of Patent: Apr. 27, 1993

[54] COMBINED HEADLIGHT AND WINDSHIELD WIPER CONTROL

[76] Inventor: Lewis L. Ruter, 919 W. Broadway, Minneapolis, Minn. 55411

[21] Appl. No.: 833,698

[22] Filed: Feb. 10, 1992

Related U.S. Application Data

[63] Continuation-in-part of Ser. No. 763,282, Sep. 20, 1991, Pat. No. 5,130,905, which is a continuation-in-part of Ser. No. 615,355, Nov. 6, 1990, Pat. No. 5,051,873.

[51] Int. Cl.$^5$ .......................... B60Q 1/00; H01H 21/6
[52] U.S. Cl. .......................... 362/61; 362/80; 362/253; 362/802; 315/82; 200/5 B; 200/50 C
[58] Field of Search ............... 362/61, 80, 253, 802, 362/276; 315/82, 83; 200/5 B, 50 C, 339, 50 R, 318

[56]  References Cited

U.S. PATENT DOCUMENTS

| 3,317,683 | 5/1967 | Clark | 200/50 C |
|---|---|---|---|
| 3,500,119 | 3/1970 | Price | 307/10.8 |
| 3,500,120 | 3/1970 | Schultz | 315/82 |
| 3,519,837 | 7/1970 | Nolin et al. | 315/82 |
| 3,591,845 | 7/1971 | Vanderpoel, Jr. | 315/82 |
| 3,600,596 | 8/1971 | Aloisantoni | 315/82 |
| 3,702,415 | 11/1972 | Schultz | 315/82 |
| 3,767,966 | 10/1973 | Bell | 315/83 |
| 3,824,405 | 7/1974 | Glaze | 307/10.8 |
| 3,909,619 | 9/1975 | Kniesly et al. | 307/10.8 |
| 4,009,363 | 2/1977 | Binegar | 307/10.8 |
| 4,010,380 | 3/1977 | Baller et al. | 315/82 |
| 4,057,742 | 11/1977 | Binegar | 307/10.8 |
| 4,097,839 | 6/1978 | Lesiak | 315/82 |
| 4,236,099 | 11/1980 | Rosenblum | 315/83 |
| 4,330,716 | 5/1982 | Rust | 307/10.8 |
| 4,337,400 | 6/1982 | Hahn | 315/82 |
| 4,570,078 | 2/1986 | Yashima et al. | 200/50 C |
| 4,656,363 | 4/1987 | Carter et al. | 315/82 |
| 4,868,353 | 9/1989 | Ohta et al. | 200/5 B |
| 4,956,562 | 9/1990 | Benedict et al. | 307/10.3 |
| 4,985,660 | 1/1991 | Cronk | 307/10.8 |
| 5,027,001 | 6/1991 | Torbert | 307/10.8 |
| 5,051,873 | 9/1991 | Ruter | 362/61 |
| 5,130,905 | 7/1992 | Ruter | 362/61 |

FOREIGN PATENT DOCUMENTS 2064238A 6/1981 United Kingdom .

Primary Examiner—Ira S. Lazarus
Assistant Examiner—L. Heyman
Attorney, Agent, or Firm—Burd, Bartz & Cutenkauf

[57] ABSTRACT

A vehicle windshield wiper and headlight control that only allows operation of the windshield wipers when the headlights are ON has a control switch assembly connected to a battery, wiper motor, headlights and parking lights. The control switch assembly has separate headlight and wiper switches that are simultaneously closed when a wiper actuator is turned ON so that the wiper motor only operates at least at low speed when the headlights are ON.

15 Claims, 5 Drawing Sheets

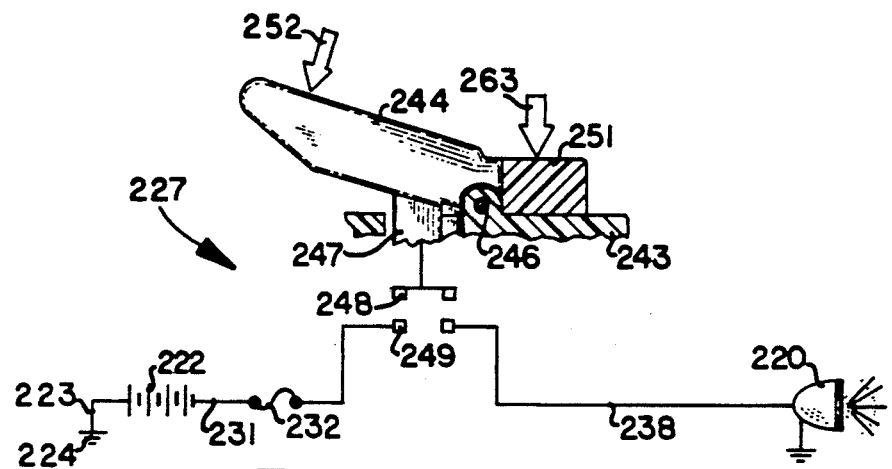
*Fig.* 7
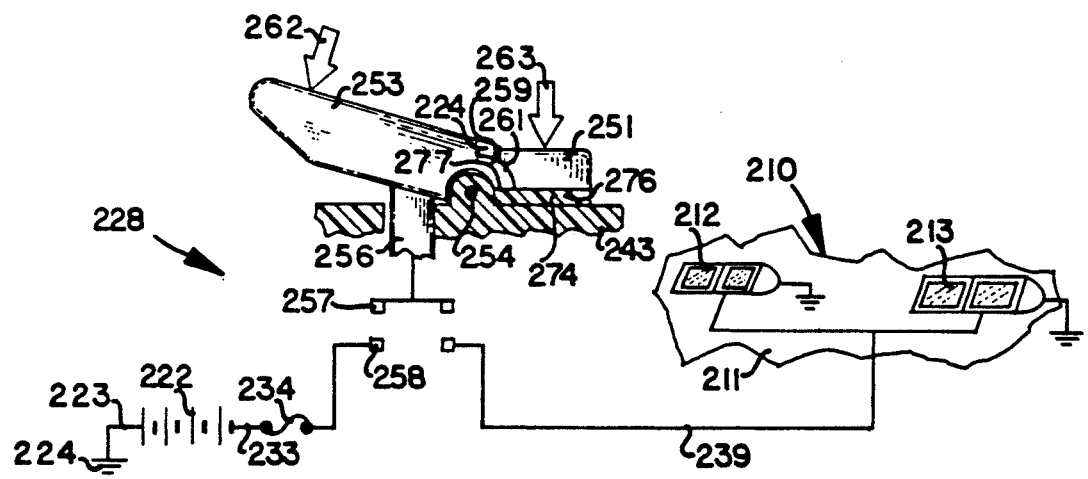
*Fig.* 8
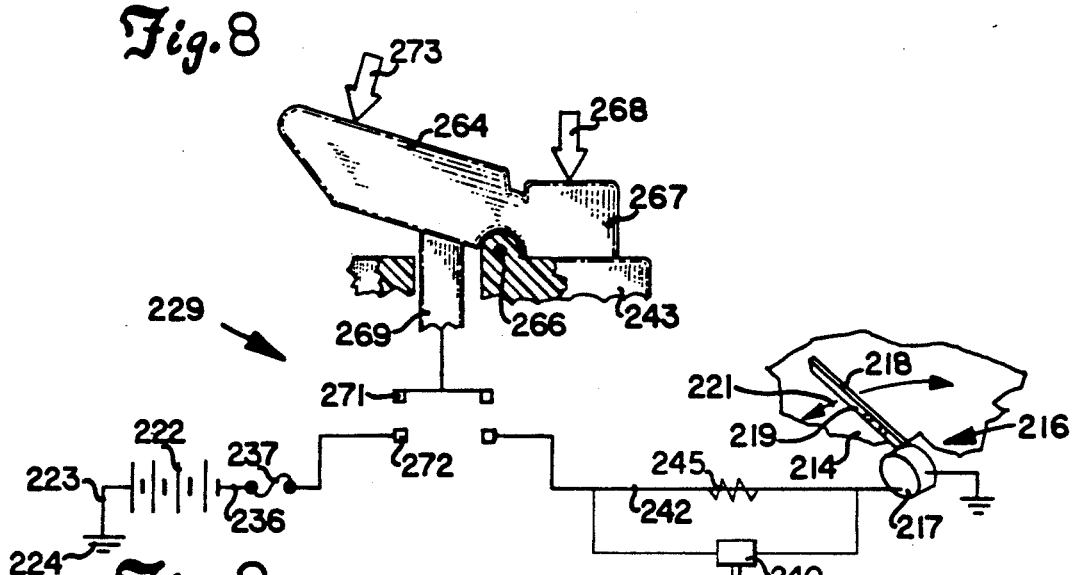
*Fig.* 9

COMBINED HEADLIGHT AND WINDSHIELD WIPER CONTROL

CROSS REFERENCE TO RELATED APPLICATION

This application is a continuation-in-part of U.S. application Ser. No. 763,282 filed Sept. 20, 1991, now U.S. Pat. No. 5,130,905.

U.S. application Ser. No. 763,282 filed Sept. 20, 1991 is a continuation-in-part of U.S. application Ser. No. 615,355 filed Nov. 6, 1990, now U.S. Pat. No. 5,051,873.

TECHNICAL FIELD

The invention is in the field of motor vehicle electrical systems that control the operation of the headlights, parking lights and windshield wipers of a vehicle, such as an automobile, truck, tractor, snowmobile and like motor vehicles.

BACKGROUND OF THE INVENTION

Motor vehicles have been for many years equiped with headlights and windshield wipers to facilitate the observation of the roadway by the operator of the vehicle. Electrical and vaccum control systems have been used to operate the windshield wipers independant of the headlights. It is a common safety practice to have the headlights turned ON during inclement weather conditions such as rain, fog, hail, snow, sleet, mist and the like. The switches and controls for operating the headlights are separate and independant from the controls for the windshield wipers. This allows the operator of the vehicle to use the windshield wipers with the headlights OFF. A conscious effort must be made by the vehicle operator to turn the headlights ON in daylight conditions during inclement weather. A number of vehicles are operated with the windshield wipers ON and the headlights OFF. Some vehicle operators inadvertantly leave the headlights ON after the vehicle has been parked. This will discharge the battery over an extended period of time and eventually result in a dead battery. The laws of some states require that the headlights of the vehicle be turned ON when the windshield wipers are operated. The operator of the vehicle must separately operate the windshield wiper controls and the headlight controls to achieve operation of the windshield wipers with the headlights ON.

SUMMARY OF INVENTION

The invention is directed to a combined windshield wiper and headlight control system that will allow operation of the windshield wipers when the headlights or the headlights and parking lights of the vehicle are ON. The control system operates through the switch for the headlights of the vehicle. The headlight switch must be turned ON to allow the windshield wipers to operate. In an alternative control system the windshield wiper switch is used to control both the windshield wipers and the headlights. The control system ensures that the headlights are ON when the windshield wipers are in operation.

In one embodiment of the combined windshield wiper and headlight control for a vehicle, the control includes a first switch that is operable to control the operation of the windshield wipers. This switch is connected to a power source such as a battery and an electric motor that operates the windshield wipers. A second switch operable to selectively turn the headlights ON and OFF is connected to the power source and the headlights. The second switch includes a pair of switches that separately control the headlights and the motor for the windshield wipers. Both of the pair of switches are normally open so that when the headlights are OFF the windshield wipers are inoperative. The second switch has an actuator which when moved to its ON position closes both the headlight and wiper switches so that the windshield wipers operate only during the time that the headlights are ON. When the actuator for the second switch is moved from the ON position to the OFF position, the headlights will be turned OFF and the operation of the windshield wipers will be terminated. An indicator incorporated into the second switch is used to provide a visual or sound signal which advises the operator that the first switch for the windshield wipers is inoperative during the time that the second switch for the headlights is OFF. Once the second switch is turned ON the indicator signal is terminated due to concurrent operation of the windshield wipers and the headlights.

In the second embodiment of the wiper control switch is provided with an indicator that advises the operator of the vehicle that the windshield wipers are operating with the headlights OFF. When the headlight switch is turned to the ON position the indicator is turned OFF or extinguished whereby the windshield wipers are operating at the time that the headlights are turned ON.

A third embodiment of the combined headlight and windshield wiper control has a switch assembly that controls the ON/OFF operation of headlights, parking lights and windshield wipers of a motor vehicle. The switch assembly has a parking light switch, headlight switch and a windshield wiper switch. When the windshield wiper switch is turned ON the parking light switch and the headlight switch are automatically turned ON so that the headligts of the vehicle are ON during the operation of the windshield wipers. The parking light switch can be turned ON independently of the headlight switch and the windshield wiper switch so that the parking lights can be turned ON independent of the headlights and windshield wipers. The headlight switch can be turned on independently of the windshield wiper switch so that the headlights can be turned on without operating the windshield wipers. The headlight switch has an actuator that is selectively movable by the operator of the vehicle between ON and OFF positions to turn the headlights ON and OFF. Located adjacent the headlight actuator is a windshield wiper actuator that is selectivly movable to ON/OFF positions to control the operations of an electric motor which operates the windshield wipers. The headlight switch actuator and windshield wiper switch actuator have coacting structure which operates to move the headlight actuator to the ON position when the windshield wiper actuator is moved to the ON position whereby the electric motor that operates the windshield wipers is only turned ON when the headlights are turned ON. The electric motor operates the windshield wipers at least at low speed when the wiper actuator is moved to the ON position. A wiper speed switch connected to the electric motor is used to change the speed of operation of the windshield wiper from low to high and intermittent speeds. The coacting structure also returns the windshield wiper actuator to the OFF position when the headlight actuator is moved to the OFF position thereby terminating the operation of the windshield wiper motor and turning the headlights OFF. The wiper actuator has a wiper ON arm and a wiper OFF arm and is pivoted on a pivot means for movement between the ON and OFF positions. The headlight actuator has a headlight ON arm and a headlight OFF arm and is pivotally mounted on a pivot for movement between its ON and OFF positions. The wiper OFF arm is engageable with the headlight OFF arm whereby movement of the wiper actuator to the ON position moves the headlight actuator to the ON position and movement of the headlight actuator to the OFF position moves the wiper actuator to the OFF position. The headlight OFF arm and wiper OFF arm also cooperate with the actuator for the parking lights so that when the parking lights are turned OFF the headlights and windshield wipers are turned OFF.

The windshield wiper and headlight control of the invention is automatic in operation as it provides for the operation of the windshield wipers only when the headlights or the headlights and parking lights of the vehicle are ON. This is a substantial enhancement of the safe operation of the vehicle. The control is easy to install and has a relatively low cost.

DESCRIPTION OF DRAWING

FIG. 7 is a sectional view taken along line 7—7 of FIG. 5 of the control switch assembly used in the combined headlight and windshield wiper control of FIG. 5.

FIG. 8 is a sectional view taken along line 8—8 of FIG. 5 of the control switch assembly used in the combined headlight and windshield wiper control of the invention; and FIG. 9 is a sectional view taken along line 9—9 of FIG. 5 of the control switch assembly used in the combined headlight and windshield wiper control of FIG. 5.

DESCRIPTION OF PREFERRED EMBODIMENTS

Figure 1:
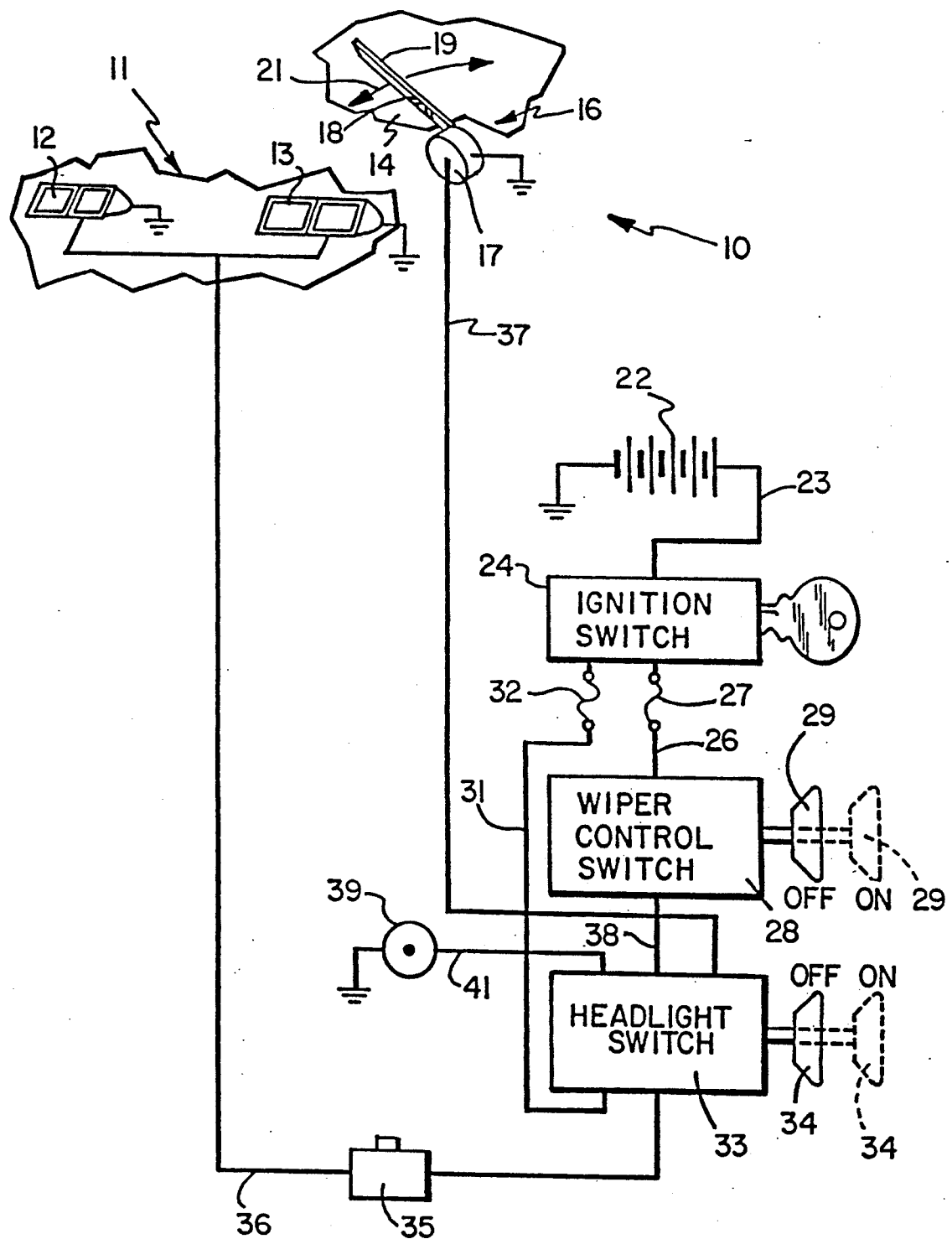
FIG. 1 is a diagramatic view of the combined headlight and windshield wiper control of the invention.

Referring to FIG. 1 there is shown a front of vehicle 10, such as an automobile, truck, tractor, snowmobile or the like, having a front end 11 supporting a pair of headlights 12 and 13. A windshield 14 is located above headlights 12 and 13.

A wiper assembly, indicated generally at 16, is used to clear windshield 14 of rain, snow, sleet, fog, bugs and like particulate materials. Wiper assembly 16 conventionally has a pair of wiper blades that are operated with an electric gear head motor 17. Each wiper blade is operatively connected to motor 17 with an arm 18 to reciprocate a wiper blade 19, as indicated by arrow 21, to clear windshield 14. The linkage that operatively connects wiper motor 17 with the wiper blade is conventional structure and does not form part of the invention.

Vehicle battery 22, such as a 12 volt D.C. battery, is connected with a cable 23 to the ignition switch 24. The electric power source can be an alternator, generator and the like. An electrical conductor line 26 having a fuse 27 connects ignition switch 24 to wiper control switch 28. Switch 28 has an ON/OFF control or actuator 29 to control the operation as well as the speed of wiper assembly 16. Wiper control switch 28 is a conventional switch that may be operated in response to either reciprocal motion or rotational motion of actuator 29.

Ignition switch 24 is also connected with a conductor line 31 having a fuse 32 to a headlight switch 33. Switch 33 can be connected directly to battery 22. Switch 33 has a movable actuator 34 operable to selectively turn headlight switch ON and OFF. A conductor line 36 having a dimmer/bright switch 35 connects headlight swith 38 to headlights 12 and 13. Headlight switch 33 is also connected with a conductor line 37 to wiper motor 17. Wiper control switch 28 is further connected with a conductor line 38 to headlight switch 33. An indicator light 39, such as a red lamp, is connected with a conductor line 41 to headlight switch 43. Light 39 will illuminate when the wiper control switch is ON and the headlights switch is OFF. The light 39 indicates to the operator of the vehicle that the headlight switch 33 must be turned ON before the wiper motor 17 will operate the wiper assembly 16. Light 39 is a visual indicator of this condition. A buzzer, voice generator or digital read out can be used in lieu of light 39 to provide the vehicle operator with information indicating that the headlight switch 33 must be turned ON before the wiper assembly 16 can be operated.

Figure 2:
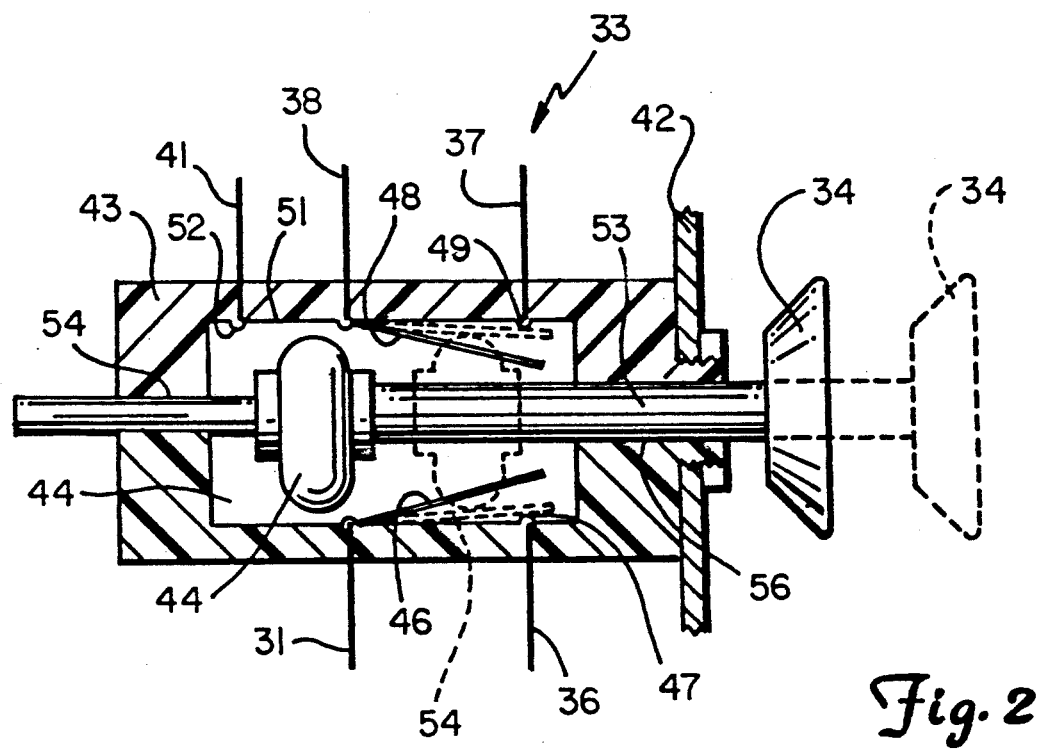
FIG. 2 is an enlarged diagramatic sectional view of the headlight switch shown in FIG. 1.

Referring to FIG. 2, there is shown a diagramatic view of headlight switch 33 mounted on vehicle dash panel 42. Switch 33 has a casing or body 43 and an internal chamber 44. A first switch located within chamber 44 is connected to line 31 that is operable to engage a contact 47 joined to line 36. First switch 46 is normally open when actuator 34 is in the OFF position. Opposite first switch 46 is a second switch 48 connected to line 38. Second switch 48 is adapted to engage a contact 49 joined to line 37. Second switch 48 is normally in the open position when switch actuator 34 is in the OFF position shown in full lines.

A third switch 51 is also connected to line 38. Third switch 51 is adapted to engage a contact 52 joined to line 41. Switch 51 is in a normally closed position when the actuator 34 is in the OFF position. When switch 28 is turned ON the circuit to light 39 is closed whereby the light is turned ON indicating that the wiper assembly 16 will not operate unless headlight switch 33 is also turned ON.

Switch actuator 34 has an elongated rod 53 that is slideably mounted on casing 43. Rod 53 has opposite ends located through bores 56 and 57 in housing 43. Detent structures (not shown) associated with rod 53 can be used to indicate the stop ON and stop OFF positions of the actuator 34.

Figure 3:
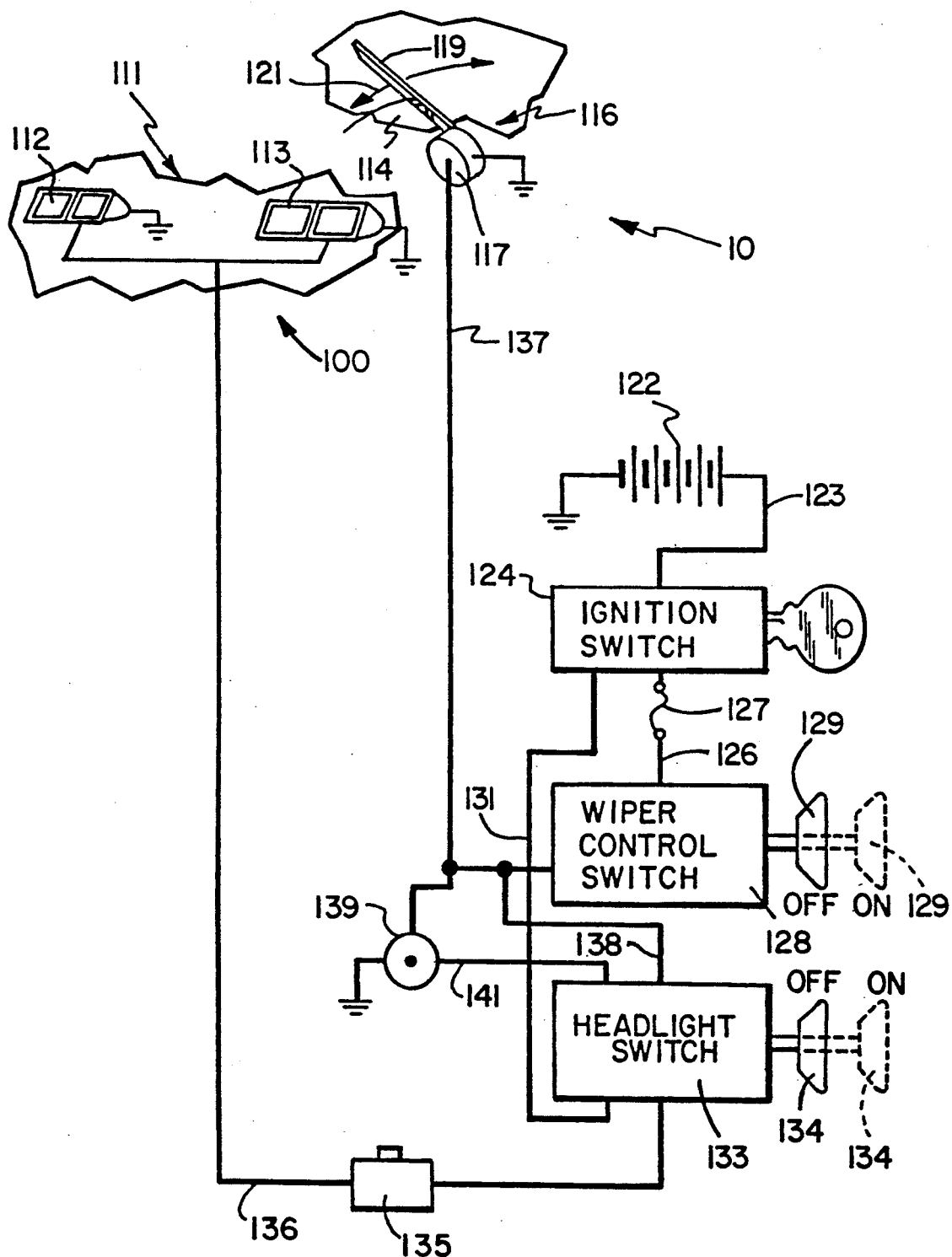
FIG. 3 is a diagramatic view of a second embodiment of the combined headlight and windshield wiper control of the invention.

Referring to FIG. 3, there is shown a second embodiment of the vehicle headlight and windshield wiper control of the invention incorporated into a vehicle 100, such as an automobile, truck, tractor, snowmobile and the like. Vehicle 100 has a front end 111 accomodating a pair of headlights 112 and 113. A windshield 114 located above the vehicle hood is cleaned with a windshield wiper assembly indicated generally at 116. Wiper assembly 116 can have a pair of wiper blades that reciprocate across windshield 114 to remove water, fog, snow, sleet, ice, bugs and foreign matter from windshield 114. Wiper assembly 116 is operated with an electric motor 117, such as a gear head motor. An arm 118 is connected to the drive mechanism for motor 117. The wiper blade 119 is usually mounted on the end of arm 118 and engageable to the outside surface of windshield surface 114. On operation of motor 117, arm 118 reciprocates as indicated by arrow 121 thereby moving blade 119 relative to windshield 114.

Vehicle 100 has an electric power source 122, such as a 12 volt D.C. battery, connected with a cable 123 to an ignition switch 124. An electrical conductor line 126 having a fuse 127 is joined to the conventional wiper control switch 128. A second conductor line 137 connects switch 128 to wiper motor 117. When ignition switch 124 is ON and wiper actuator 129 is moved to the ON position, indicated in broken lines, motor 117 operates wiper assembly 116. Ignition switch 124 is connected with a conductor line 131 to a headlight control switch 133 having a moveable actuator 134. Switch 133 can be connected directly to battery 122. A dimmer/bright switch 135 is located in a conductor line 136 connecting switch 133 to headlights 112 and 113. Switch 133 is connected with conductor lines 138 and 141 to conductor line 127 leading to the wiper motor 117. A light 139 is located in line 141. Light 139 can be replaced with a buzzer, voice generator or a digital readout which indicates to the vehicle operator that wiper assembly 116 is operating when headlights 112 and 113 are OFF. The operator of the vehicle is then aware that the light control switch 133 should be turned on so that headlights 112 and 113 are ON at the same time that the wiper assembly 116 operates.

Figure 4:
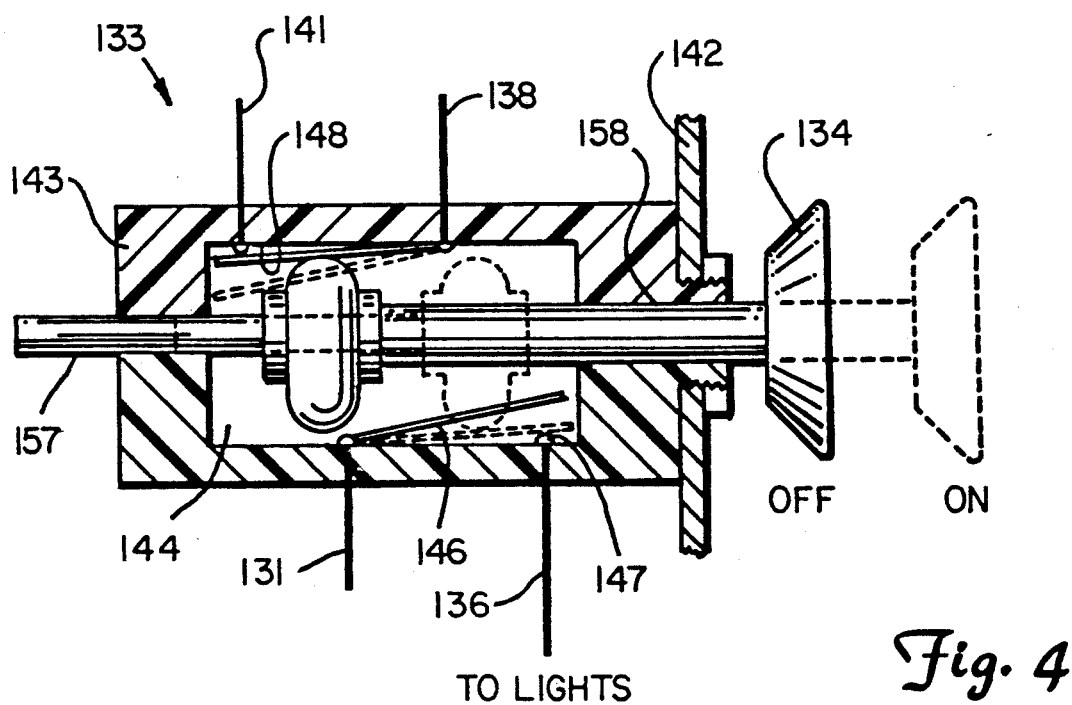
FIG. 4 is an enlarged sectional view of the headlight light switch shown in FIG. 3.

Referring to FIG. 4, wiper control switch 133 is mounted on the dash/panel 143 of the vehicle providing convenient operator access to actuator 134. Switch 133 has a casing or housing 143 having an internal chamber 144. A first switch 146 within chamber 144 is connected to line 131 and operable to engage a contact 147 joined to line 136. Switch 146 is normally open when actuator 134 is in the OFF position. Movement of actuator 34 to the ON position will close switch 146. Opposite first switch 146 is a second switch 148 connected to line 138 and operable to engage a contact 149 joined to line 141. Switch 148 is normally closed when the actuator 134 is in the OFF position. In the event that the wiper switch 128 is turned ON thereby operating the wiper assembly 116, the electric circuit to light 139 is closed so that the light will be ON to tell the operator to turn on the headlights. Switch 148 will open when actuator 134 is moved to the ON position as shown in broken lines. When switch 148 is open the light 139 will be OFF indicating that headlights 112 and 113 are ON.

Actuator 134 has an elongated linear rod 153 that is slideably located in bores 156 and 157 in opposite ends of housing 143. The middle portion of rod 153 carries a head 154 adapted to engage and operate the switches 146 and 148.

In use when light control switch 143 is in the OFF position second switch 148 is closed. Light 139 will be OFF if the wiper control switch 128 is OFF. When wiper control switch 128 is moved to the ON position, wiper assembly 116 will operate to clear windshield 116. Light 139 will be ON to indicate to the operator that the windshield wipers are operating with the headlights OFF. The operator then can move the light switch actuator to the ON position to turn headlights 112 and 113 ON so that headlights 112 and 113 are ON during the time that the windshield wipers are operating. When switch 134 is moved to the ON postion second switch 148 will open thereby terminating the power to the light 139 since its function of making the operator aware that the headlights are not ON has been completed.

Figure 5:
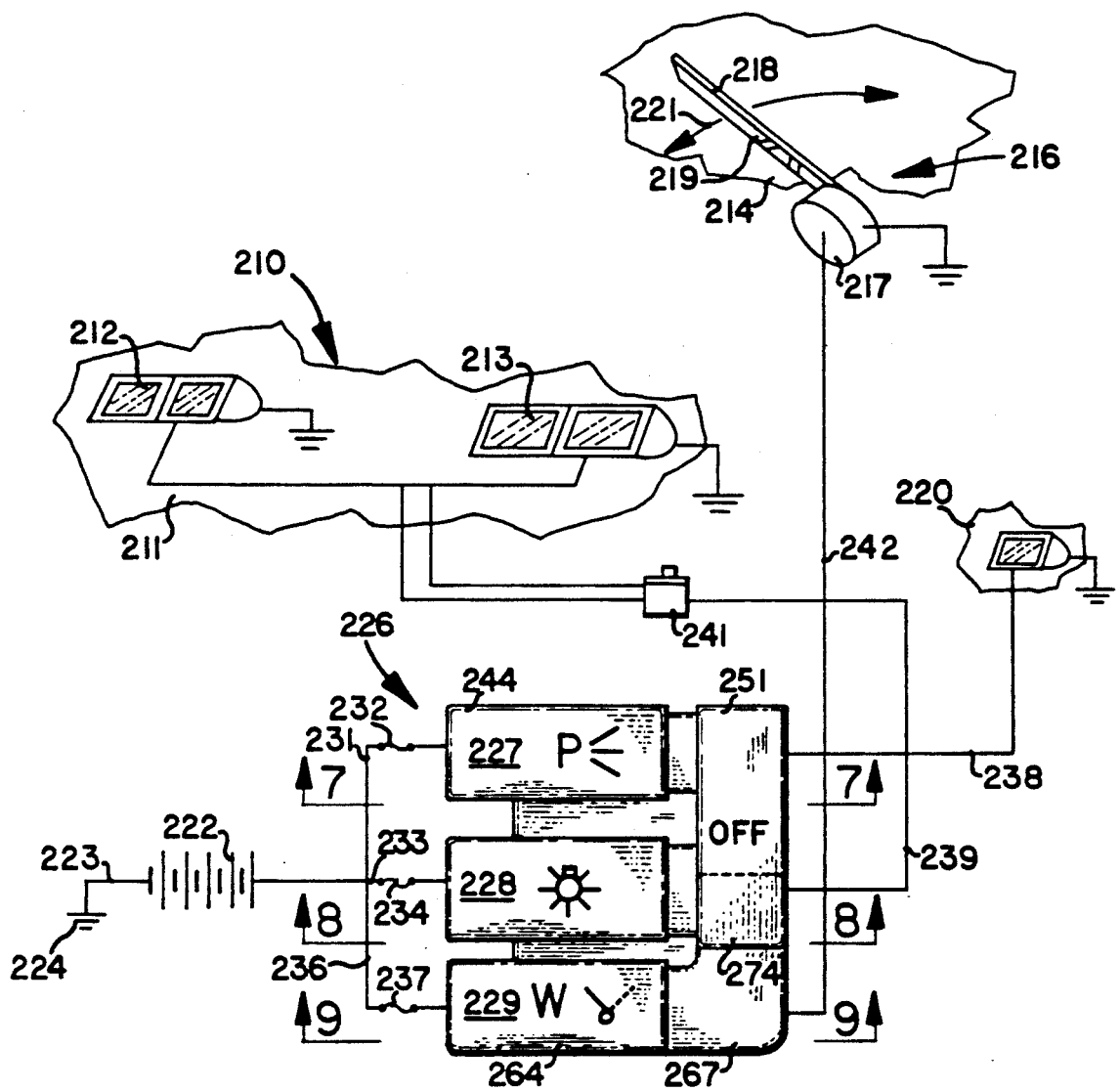
FIG. 5 is a diagramatic view of a third embodiment of the combined headlight and windshield wiper control of the invention.

Referring to FIG. 5, there is shown a front of a vehicle indicated generally at 210, such as a automobile, truck, tractor, snowmobile and the like, having a front end 211 supporting a pair of headlights 212 and 213 and parking lights 220. The parking lights are located on the front and rear of the vehicle. Vehicle has a windshield 214 located upwardly and above headlights 212 and 213. This structure is s conventional vehicle headlight and parking light structure and does not form part of the invention.

A windshield wiper assembly, indicated generally at 216, is used to clear windshield 214 of rain, fog, snow, sleet, dust, dirt, bugs and the like including particulate materials that may accumulate on windshield 214 during operation and parking of the vehicle. Wiper assembly 216 is a conventional structure having a pair of wiper blades that are operated with one or more electric motors, such as gear head motors, to reciprocate the blades over the windshield and thereby clear the windshield of foreign material. Each wiper blade is operatively connected to an electric motor 217 with an arm 218 to reciprocate blade 219, as indicated by arrow 221, to clear windshield 214. The linkage that operatively connects wiper motor 217 with the wiper blade structure is a conventional arrangement of structure and does not form part of the invention.

Vehicle 210 has a conventional electric power source 222, such as a 12 volt D.C. battery, connected with a battery cable 223 to ground 224. Battery 222 is electrically connected to a switch assembly, indicated generally at 226, used to control the operation of the windshield wiper assembly 216 concurrently with the headlights 212, 213 and parking lights 220. Switch assembly 226 is a unitary switch structure that is mounted on the vehicle dash panel (not shown) in a location for convenient operation by the vehicle operator. Switch assembly 226 is mounted as a single unit on the vehicle dash without further assembly to reduce vehicle production labor and time.

Figure 6:
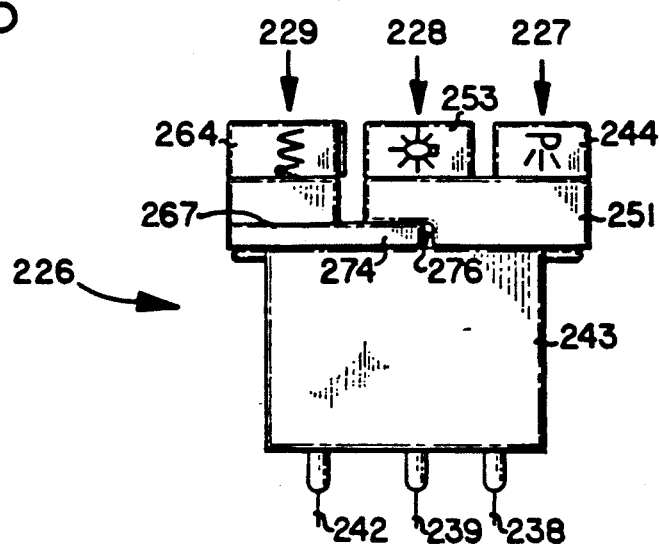
FIG. 6 is an elevational view of the right side of the control switch assembly of FIG. 5.

As shown in FIGS. 5 and 6, switch assembly 226 has a parking switch 227, a headlight switch 228 and a windshield wiper switch 229 which are identified by design indicia for the convenience of the operator. The parking light switch 227 is electrically connected to the battery with a line 231 having fuse 232. A line 238 connects switch 227 to the vehicle parking lights 220. A second conductor line 233 having a fuse 234 connects battery 222 to headlight switch 228. An electrically conductor line 239 connects switch 228 to vehicle headlights 212, 213. A bright/dimmer switch 241 is interposed in line 239 to allow the operator of the vehicle to selectively turn the headlights to an ON bright or an ON dim condition. The windshield wiper switch 229 is connected with a line 236 having a fuse 237 to battery 222. A line 242 connects windshield wiper switch 229 to electric motor 217 of windshield wiper assembly 216 to complete the electric circuit to motor 217. A wiper speed control switch 240 connected in parallel with a resister 245 in line 242 is used to change the operating speeds of the windshield wiper motor 217 from low to high and intermittent speeds. The wiper motor 217 will operate always at least at low speed regardless of the position of wiper speed control switch 240 when wiper actuator is moved to the ON position.

As shown in FIG. 6, switch assembly 226 has a casing or housing 243 that encloses the electrical switch contacts of switch assembly 226 and provides support for the switch assembly on the dash panel of the vehicle. Casing 243 pivotally supports a parking light switch actuator 244, headlight switch actuator 253, and windshield wiper switch actuator 264 for selective movements between ON and OFF positions. Actuators 244, 253 and 264 are located in side-by-side positions to provide the operator with a useful single location for manual operation of the parking light switch 229, headlight switch 228 and windshield wiper switch 229.

As shown in FIG. 7, wiper actuator 244 is pivotally mounted on a pivot 246. The pivot 246 comprises an upward semi-circular projection on casing 243 and a transverse pivot pin. A downwardly directed finger 247 is joined to the ON arm of actuator 244. Finger 247 is connected to moveable contacts 248 which are adapted to engage electrical contacts 249 joined to lines 231 and 238 so that when actuator 244 is moved to the ON positions as indicated by the arrow 252 contacts 248 and 249 will be closed thereby completing the electrical circuit to parking lights 220. Actuator 244 has an OFF arm 251 which when pressed as indicated by the arrow 263 will move the actuator to the OFF position thereby opening contacts 248 and 249 and turning parking lights 220 OFF. As seen in FIGS. 5 and 6, the OFF arm 251 of actuator 244 has a lateral extension that extends over the OFF arm 259 of headlight actuator 253.

As shown in FIG. 8, headlight actuator 253 is pivotally mounted on a pivot 254 comprising an upwardly directed semi-circular projection of casing 243 and a transverse pivot pin for movement between ON and OFF positions. The ON arm of actuator 253 has a downwardly directed finger 256 that extended into casing 243 and connected to moveable electrical contacts 257. Contacts 257 are moveable into engagement with contacts 258 connected to lines 233 and 239 so that when contacts 257 and 258 are closed the electrical circuit to headlights 212, 213 is completed thereby turning the headlights ON. The actuator 253 has a curved OFF arm 259 that extends into a side recess 261 of OFF arm 251 of the parking light actuator 244. This allows the parking actuator to be moved to the ON position without moving headlight actuator 253 to the ON position. In other words, parking actuator 244 can be moved to the ON position to turn the parking lights ON and leaving the headlights OFF. OFF arm 259 being in engagment with the OFF arm 251 of parking actuator 244 will turn parking actuator 244 to the ON position when headlight actuator 253 is turned ON whereby the headlights and parking lights are simultaneously ON. The operator of the vehicle merely presses the OFF arm 251 as indicated by arrow 263 to turn both the parking lights and headlights OFF. The parking lights and headlights are simultaneously turned ON by the operator by moving the headlight actuator 253 in the direction of arrow 262 thereby closing the electrical contacts 257 and 258 for the headlight circuit and the contacts 248 and 249 for the parking light circuit.

Referring to FIG. 9, wiper actuator 264 is pivotally mounted on the casing 243 with a pivot 266 comprising an upwardly directed semi-circular projection on casing 243 and a transverse pivot pin. The ON arm of actutor 264 has a downwardly directed finger 269 that is connected to electrical contacts 271. The contacts 271 are moved into engagement with contacts 272 connected to lines 236 and 242 to close the electrical circuit to the windshield wiper motor 217. Actuator 264 is moved downwardly in the direction of arrow 273 to close electrical contacts 271 and 272. Actuator 264 has an OFF arm 267 that can be moved downwardly in the direction of arrow 268 to open contacts 271 and 272 thereby breaking the electrical circuit to electric motor 217 to stop the operation of the windshield wipers. Wiper actuator 264 can be moved to the OFF position independent of the ON or OFF positions of the parking actuator 224 and headlight actuator 253. As seen in FIG. 6, the OFF arm 267 of wiper actuator 264 has a lateral projection 274 that extends into a recess 276 in the bottom of the parking light OFF arm 251 and a recess 277 at the bottom end of the OFF arm 251 of the headlight actuator 253, as seen in FIG. 8. When wiper actuator 264 is moved to the ON position by applying manual pressure in the direction of arrow 273 contacts 271 and 272 will be closed thereby completing the electricl circuit to electric motor 217 for the windshield wipers to operate the windshield wipers. Electric motor 217 operates windshield wiper assembly 216 at least at low speed when actuator 264 is moved to the ON position. Wiper speed switch 240 connected to wiper motor 217 is used to change the speed of operaton of the motor and windshield wiper assembly 216 from low to high and intermittent speeds. Projection 274 being located under arms 251 and 259 of parking actuator 244 and headlight actuator 253 will pivot the parking actuator 244 and headlight actuator 253 to the ON position thereby completing the electrical circuits to parking lights 220 and headlights 212, 213. The headlights 212, 213 and parking lights 220 are ON during the operation of the windshield wipers assembly 216. The headlights cannot be turned OFF with the windshield wipers remaining in operation. The windshield wipers are turned OFF by applying a force on either arm 251 or arm 267 as indicated by arrows 163 and 268. When force is applied to arm 251 the windshield wipers and headlights and parking lights are simultaneously turned OFF. When force is applied to arm 267 as indicated by the arrow 268 in FIG. 8, the windshield wipers assembly 216 will be turned OFF. The headlights 212, 213 and parking lights 220 will remain ON.

While there has been shown and described preferred embodiments of the combined headlight and windshield wiper control of the invention and the switch assembly for the parking lights, headlights and windshield wipers of a motor vehicle, it is understood the changes in structure, electrical circuits and components of the circuits may be made by those skilled in the art without departing from the invention. The invention is defined in the following claims.

I claim:

1. A control for connecting an electric power source to vehicle headlights and electric powered means to operate the windshield wiper means of the vehicle only when the headlights are ON comprising: windshield wiper switch means connected to said electric power source having windshield wiper actuator means selectively movable to ON and OFF conditions to control the operation of the electric powered means to operate the windshield wiper means, headlight switch means operable to selectively switch means having headlight actuator means selectively moveable to ON and OFF positions to turn the headlights ON and OFF, said windshield wiper actuator means and headlight actuator means having coacting means operable to move the headlight switch actuator means to the ON position when the windshield wiper actuator is moved to the ON position whereby the electric powered means operated the windshield wiper actuator means to the OFF position when the headlight actuator means is moved to the OFF position thereby terminating the operation of the electric powered means and turning the headlights OFF, said wiper actuator means includes a wiper actuator having a wiper ON arm and a wiper OFF arm, first pivot means pivotally mounting the wiper actuator for movement between ON and OFF positions, the headlight actuator means includes a headlight actuator located adjacent the wiper actuator having a headlight ON arm and a headlight OFF arm, second pivot means pivotally mounting the headlight actuator for movement between ON and OFF positions, said wiper OFF arm having a lateral projection extended under the headlight OFF arm and engageable with the headlight OFF arm whereby movement of the wiper actuator to the ON position moves the headlight actuator to the ON position.

2. The control of claim 1 with a vehicle having parking light including: a parking light switch connected to the power source having a parking light switch actuator movable between an ON position and an OFF position to turn vehicle parking lights ON and OFF, said lateral projection of the wiper OFF arm engagable with the parking light switch actuator whereby the parking light switch actuator is moved to the ON position when the wiper switch actuator is moved to the ON position.

3. The control of claim 2 wherein: the parking light switch actuator has an OFF arm engagable with the OFF arm of the headlight switch actuator and the OFF arm of the wiper switch actuator whereby when the wiper switch actuator is moved to the ON position the headlight switch actuator and parking light switch actuator is moved to their ON positions and when the parking light switch actuator is moved to the OFF position the headlight switch actuator and parking light switch actuator are moved to the OFF position.

4. A control for connecting an electric power source to vehicle headlights and electric power means to operate the windshield wiper means of the vehicle only when the headlights are ON comprising: windshield wiper switch means connected to said electric power source operable in response to ON and OFF conditions to control the operation of the electric power means to operate the windshield wiper means ,headlight switch means operable in response to ON and OFF, said headlight switch means and windshield wiper switch means having coacting means operable to move the headlight switch means to the ON condition when the wiper switch means is moved to the ON condition whereby the electric power source operates the windshield wiper means only when the headlight switch means is ON and the headlights are ON, said wiper switch means has a wiper actuator movably to ON and OFF positions, the headlight switch means has a headlight actuator moveable to ON and OFF positions, said coacting means including a member connected to the wiper actuator and engageable with the headlight actuator to move the headlight actuator to the ON Position when the wiper actuator is moved to the ON position, said wiper actuator has an ON arm and an OFF arm, first pivot means pivotally mounting the wiper actuator for movement between ON and OFF positions, the headlight actuator has an ON arm and an OFF arm second pivot means pivotally mounting the headlight actuator for movement between ON and OFF positions, said member being part of the OFF arm of the wiper switch actuator and engageable with the OFF arm of the headlight switch actuator whereby movement of the wiper switch actuator to the ON position moves the headlight switch actuator to the ON position and movement of the headlight switch actuator to the OFF position moves the wiper switch actuator to the OFF position.

5. The control of claim 4 wherein: the OFF arm of the headlight switch actuator has a recess in the lower section thereof, said member being located in said recess.

6. The control of claim 4 wherein: the first pivot means and second pivot means are in general axial alignment whereby the wiper actuator and headlight actuator pivot about a common axis.

7. The control of claim 4 with a vehicle having parking light including: a parking light switch connected to the power source having a parking light switch actuator movable between an ON position and an OFF position to turn vehicle parking lights ON and OFF, said member of the wiper OFF arm engagable with the parking light switch actuator whereby the parking light switch actuator is moved to the ON position when the wiper switch actuator is moved to the ON position.

8. The control of claim 7 wherein: the parking light switch actuator has an OFF arm engagable with the OFF arm of the headlight switch actuator and the OFF arm of the wiper switch actuator whereby when the wiper switch actuator is moved to the ON position the headlight switch actuator and parking light switch actuator is moved to their ON positions and when the parking light switch actuator is moved to the OFF position the headlight switch actuator and parking light switch actuator are moved to the OFF position.

9. A control for connecting an electric power source to vehicle headlights, parking lights and to electric motor means to operate the windshield wipers of the vehicle when the headlights and parking lights are ON comprising: a wiper switch operable to control the operation of the electric motor means to operate the windshield wipers, first conductor means connecting the wiper switch to the power source, a headlight switch operable to connect and disconnect the electric power source with the headlights, second conductor means connecting the headlight switch to the headlights, a parking light switch operable to connect and disconnect the electric power source with the parking lights, third conductor means connecting the parking light switch to the parking lights, said wiper switch, parking light switch and headlight switch having coacting means operable to move the headlight switch and parking light switch to ON positions when the wiper control switch is moved to the ON position whereby the electric power source operates the windshield wipers only when the headlights and parking lights are ON.

10. The control of claim 9 wherein: the wiper actuator means includes an actuator having an ON arm and an OFF arm, and pivot means pivotally mounting the actuator for movement between ON and OFF positions, said OFF arm being engageable with the headlight actuator means whereby movement of the actuator to the ON position moves the headlight actuator means to the ON position.

11. The control of claim 9 wherein: the wiper actuator means includes a wiper actuator having a wiper ON arm and a wiper OFF arm, first pivot means pivotally mounting the wiper actuator for movement between ON and OFF positions, the headlight actuator means includes a headlight actuator located adjacent the wiper actuator having a headlight ON arm and a headlight OFF arm, second pivot means pivotally mounting the headlight actuator for movement between ON and OFF positions, said wiper OFF arm being engagable with the headlight OFF arm whereby movement of the wiper actuator to the ON position moves the headlight actuator 12. The control of claim 11 wherein: the wiper OFF arm has a lateral projection extended under the headlight OFF arm.

13. The control of claim 9 wherein: the parking light switch has an actuator movable between an ON position and an OFF position to turn the vehicle parking lights ON and OFF, said coacting means including a lateral projection on the wiper actuator engagable with the headlight switch actuator and parking light switch actuator whereby when the wiper actuator is moved to the ON position the headlight switch actuator and parking light switch actuator are moved to their ON positions and when the parking light switch actuator is moved to the OFF position the headlight switch actuator and wiper switch actuator are moved to the OFF positions.

14. The control of claim 13 wherein: the wiper switch actuator has an OFF arm, the headlight switch actuator has an OFF arm, the parking light switch actuator has an OFF arm, said lateral projection being part of the OFF arm of the wiper switch actuator and engagable with the OFF arms of the headlight switch actuator and parking light switch actuator.

15. The control of claim 14 wherein: the OFF arms of the wiper switch actuator and headlight switch actuator have recesses accommodating the lateral projection.

* * * * *